(12) United States Patent
Cooke

(10) Patent No.: US 6,439,203 B1
(45) Date of Patent: Aug. 27, 2002

(54) SEAL ARRANGEMENT

(75) Inventor: Michael Peter Cooke, Gillingham (GB)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/699,012

(22) Filed: Oct. 27, 2000

(30) Foreign Application Priority Data

Oct. 29, 1999 (GB) ............................................ 9925751

(51) Int. Cl.⁷ ................................................ F16J 9/00
(52) U.S. Cl. ........................ 123/470; 123/471; 277/435
(58) Field of Search ................................ 123/470, 471; 277/435, 436, 437, 459, 460, 467, 477, 490, 493, 543, 544, 578, 502

(56) References Cited

U.S. PATENT DOCUMENTS 1,752,848 A * 4/1930 Howard ........................ 277/487
1,856,961 A * 5/1932 Madsen ........................ 277/469
6,254,103 B1 * 7/2001 Cooke .......................... 277/435

* cited by examiner

Primary Examiner—Willis R. Wolfe
Assistant Examiner—Hai Huynh
(74) Attorney, Agent, or Firm—Thomas N. Twomey

(57) ABSTRACT

A seal arrangement having a bore within which a component is to be received, in use, the seal arrangement comprising a seal member formed from a resilient material, the seal member having an inner periphery and an outer periphery and being provided with a fracture to define two ends of the seal member. When in a relaxed condition, the inner periphery of the seal member has a smaller diameter than the diameter of the component such that, when the component is received through the bore of the seal arrangement, the two ends of the seal member are caused to part, the resilience of the seal member causing the inner periphery of the seal member to form a substantially fluid tight seal with the component. The seal arrangement further comprises a support member upon which the seal member is mounted, the support member being of generally annular form and having inner and outer peripheries, wherein the inner periphery of the support member is of generally circular form except for a region of irregularity. The invention also relates to a method of manufacturing a seal arrangement.

18 Claims, 3 Drawing Sheets

SEAL ARRANGEMENT

The invention relates to a seal arrangement, and in particular to a seal arrangement capable of withstanding high pressures and suitable for use in the fuel supply system for a compression ignition internal combustion engine. The invention also relates to a method of manufacturing a seal arrangement.

In the fuel system for a compression ignition internal combustion engine, very high fuel pressures are commonly encountered. For example, in a fuel system of the common rail type, the fuel pressure within the common rail may be around 2000 bar. In order to achieve such high pressures, and in order to optimise efficiency, it is important to restrict leakage from the various parts of the fuel system, for example the fuel pump and the fuel injectors, to a very low level. In particular, at such high pressures the fuel pressure within bores formed in the components used in the fuel system may cause dilation of the bores and, as a result, the clearance between the walls of the bores and any members slidable within the bores may increase, thereby giving rise to increased fuel leakage.

European Patent Application No. 0 978 650 A describes a seal arrangement which aims to alleviate the problem of fuel leakage in a fuel system. The seal includes a support member having an outer periphery of circular form, the support member carrying a resilient seal member. The seal member has an outer periphery also of generally circular form and having a diameter which is greater than that of the outer periphery of the support member. When the seal member adopts a relaxed condition, the seal member and the support member are eccentric to one another. When the seal is compressed, the seal member and the support member are of substantially equal diameter and are substantially coaxial, the seal member being provided with slots which permit the seal member to be compressed so as to reduce the diameter of the outer periphery. In use, the seal may be introduced into the bore of a fuel pump within which a substantially fluid tight seal is to be formed, a piston being slidable within the bore and being received through the bore of the seal. The introduction of the seal into the bore requires compression of the seal member. When the seal is introduced into the bore, the resilience of the seal member causes the outer surface thereof to engage the wall of the bore in a substantially fluid tight manner. In use, the seal therefore adopts an internal position within the bore.

Internal seals of this type are only suitable for use in arrangements in which the piston is under compression within the bore. If the piston is not under compression within the bore, additional components may be required to maintain the seal in place. Furthermore, it can be desirable to coat the bore within which the piston is arranged with a wear resistant coating to reduce wear on the bore in the region of the seal. Such coatings can, however, be difficult to apply inside the bore.

It is one object of the invention to provide a seal arrangement suitable for use in a variety of fuel system applications whereby leakage of fuel can be restricted to an acceptable level, even when the fuel system is to be operated at high fuel pressures. It is a further object of the present invention to provide a seal arrangement which permits the aforementioned disadvantages to be mitigated or overcome.

According to a first aspect of the present invention there is provided a seal arrangement having a bore within which a component is to be received, in use, the seal arrangement comprising a seal member formed from a resilient material, the seal member having an inner periphery and an outer periphery and being provided with a fracture to define two ends of the seal member, the inner periphery of the seal member having, when in a relaxed condition, a smaller diameter than the diameter of the component such that, when the component is received through the bore of the seal arrangement, the two ends of the seal member are caused to part, the resilience of the seal member causing the inner periphery of the seal member to form a substantially fluid tight seal with the component, the seal arrangement further comprising a support member, upon which the seal member is mounted, the support member being of generally annular form and having inner and outer peripheries, the inner periphery of the support member being of generally circular form except for a region of irregularity.

The seal arrangement of the present invention provides the advantage that the inner periphery, as opposed to the outer periphery, of the seal member provides the sealing function. Thus, for the purpose of sealing a bore within which a piston member is slidable, the seal arrangement can be mounted externally of the bore, the inner periphery of the sealing member forming a substantially fluid tight seal with the outer surface of the piston member to substantially prevent fuel leakage from the bore. For conventional, internal bore mounted seals, the outer surface of the sealing member provides the sealing function. It is, however, often desirable to provide the surface of the bore with a wear resistant coating and this can be difficult to achieve. In the present invention, as the wear resistant coating can be applied to the outer surface of the piston member, the coating can be applied more easily. Furthermore, the seal arrangement of the present invention can be retained in position without the need for additional components, even if the piston member is not under compression.

Conveniently, upon parting, the two ends of the seal member define a clearance gap. The seal arrangement of the present invention provides the further advantage that, in use, as the outer surface of the piston member becomes worn, the clearance gap tends to close, thereby further reducing fuel leakage from the bore within which the piston member is slidable. A similar advantage is obtained if the bore of the seal arrangement becomes worn.

Conveniently, the diameter of the inner periphery of the support member forms a clearance fit with the component to be received through the bore of the seal arrangement, except for the region of irregularity.

The region of irregularity is conveniently provided by forming a relieved section on the inner periphery of the support member, the relieved section having a smaller radius of curvature than that of the generally circular section of the inner periphery of the support member so as to engage with a portion of the component, in use.

Preferably, the relieved section is substantially aligned with the clearance gap. In this way, any residual fuel leakage which may occur through the clearance gap is prevented.

The outer periphery of the support member may be of generally circular form. Conveniently, the outer periphery of the support member may be provided with an alignment feature which permits the region of irregularity to be aligned with the clearance gap upon assembly of the seal.

The outer periphery of the seal member may be of generally circular form. Alternatively, the outer periphery of the seal member may be shaped to include regions of relatively large diameter and regions of relatively small diameter.

The regions of relatively small diameter increase the flexibility of the seal member. This reduces the frictional loading on the outer surface of the component to be received through the bore of the seal. Furthermore, during manufacture, the regions of relatively large diameter provide a means of support for the seal member and also provide convenient points at which the seal member can be secured to the support member.

According to another aspect of the invention, there is provided a fuel pump comprising a piston member slidable within a bore, a surface associated with the piston being exposed to fuel pressure within a chamber, the piston member carrying a seal arrangement of the type described herein, the inner periphery of the seal member of the seal arrangement engaging the outer surface of the piston member to substantially prevent fuel from flowing between the bore and the chamber when the piston member moves within the bore.

According to a further aspect of the invention, there is provided a fuel injector comprising a piston member slidable within a bore, a surface associated with the piston being exposed to fuel pressure within a chamber, the piston member carrying a seal arrangement of the type described herein, the inner periphery of the seal member of the seal arrangement engaging the outer surface of the piston member to substantially prevent fuel from flowing between the bore and the chamber when the piston member moves within the bore.

It will be appreciated that reference to a flow of fuel between the bore and the chamber includes the flow of fuel from the bore to the chamber and vice versa, depending on orientation.

The piston member may comprise a first region of relatively large diameter and a second region of relatively small diameter, the first region being slidable within a first bore and the second region being slidable within a second bore, the first bore and the second bore being substantially co-axially aligned, the second bore being of larger diameter than the diameter of the second region so as to define a clearance between the second bore and the second region, the seal member being arranged to sealingly engage the outer surface of the second region of the piston member so as to substantially prevent fuel flow therepast.

The clearance between the second bore and the second region of the piston member enables any eccentricities between the first and second bores to be accommodated.

According to a further aspect of the present invention, there is provided a pressure regulating valve for controlling fuel pressure within a passage, the valve comprising the seal arrangement as described herein, the seal arrangement being in sealing engagement with the component received through the bore of the seal arrangement and the passage being defined, in part, by the component.

According to a further aspect of the invention, there is provided a method of manufacturing a seal arrangement as herein described comprising the steps of:

providing a seal member formed from a resilient material with a region susceptible to fracture, applying a force to the seal member so as to controllably fracture the seal member at the region.

The region susceptible to fracture may be a stress concentration or an aperture.

Conveniently, the method may include the step of inserting a member through the bore of the seal arrangement or by applying a shear force to the seal member in the region susceptible to fracture in order to fracture the seal member. The member inserted through the bore to fracture the seal member may be the component to be received through the bore of the seal arrangement, in use, the component being provided with a chamfer.

The method may comprise the steps of;

providing a support member upon which the seal member is to be mounted, securing the seal member to the support member, forming a bore through the support member and the seal member, the bore being shaped such that an inner periphery of the support member is formed with a generally circular form except for an irregularity which is substantially aligned with the region of the seal member which is susceptible to fracture.

Preferably, the step of applying a force to the seal member to fracture the seal member is carried out after the support member has been secured to the seal member.

The invention will now be described, by way of example only, with reference to the accompanying drawings in which.

Figure 1:
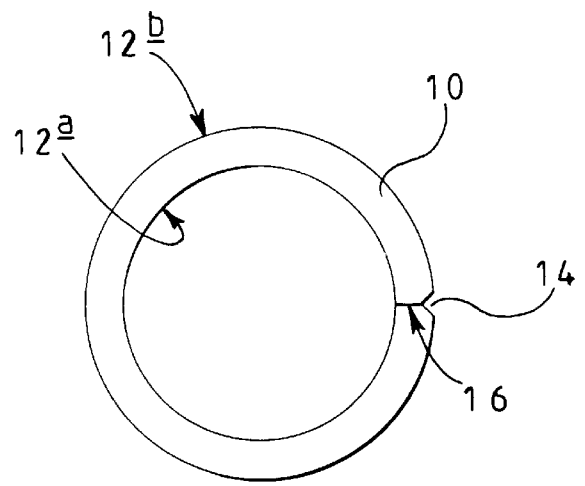
FIG. 1 is a plan view of a seal arrangement in accordance with an embodiment of the present invention.
Figure 2:
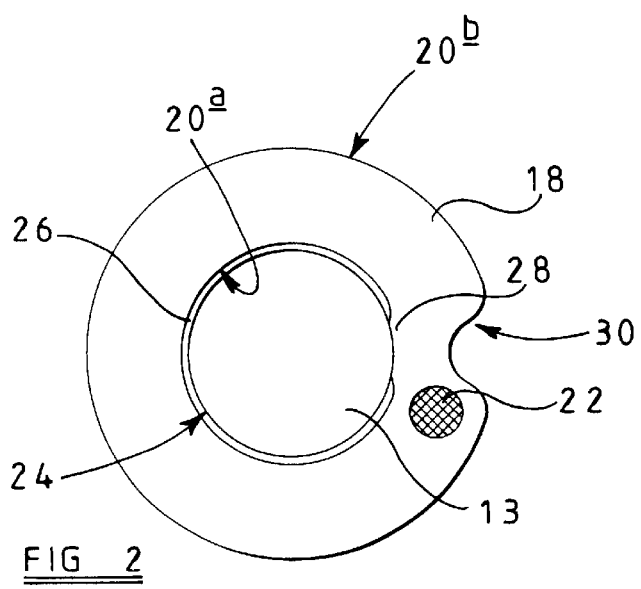
FIG. 2 is a plan view of a support member forming part of the seal arrangement in FIG. 1.

Referring to FIGS. 1 to 3, a seal arrangement comprises a seal member 10 of generally annular form having an inner periphery 12a and an outer periphery 12b, the inner periphery 12a of the seal member 10 having a diameter which is slightly smaller than the diameter of a component 13 (as shown in FIG. 2) around which the seal member 10 fits to provide a sealing function. A region of stress concentration 14 is provided in the seal member 10 such that, on manufacture of the seal member 10, the seal member 10 may be fractured or split controllably at the region 14 to define a clearance gap 16 between two ends of the seal member 10. It will be appreciated that the region 14 need not be a stress concentration but may take the form of any region which is susceptible to fracture. For example, the seal member 10 may be provided with a small diameter aperture.

As shown in FIG. 2, the seal arrangement also includes a support member 18, upon which the seal member 10 is mounted, the support member 18 having an inner periphery 20a and an outer periphery 20b. The inner peripheries 12a 20a of the seal member 10 and the support member 18 respectively together define a bore of the seal arrangement through which the component 13 is received, in use. As denoted by the hatched region in FIG. 2, a region 22 of the support member 18 is secured to the seal member 10. The support member 18 and the seal member 10 are conveniently secured to one another using a resistance welding technique, but it will be appreciated that the support member and the seal member may be secured to one another using an alternative technique. Typically, the support member 18 and the seal member 10 are formed from a resilient material, for example spring steel or phosphor bronze.

The inner periphery 20a of the support member 18 is of generally circular form, except for the provision of a relieved section 28 having a smaller radius of curvature than the radius of curvature of the inner periphery 20a.

When the seal arrangement is assembled, the section 28 of the inner periphery 20a of the support member 18 is substantially co-radial with the adjacent part of the inner periphery 12a of the seal member 10, the seal member 10 being arranged on the support member 18 such that the clearance gap 16 defined by the two ends of the seal member 10 aligns with the section 28.

The outer periphery 20b of the support member 18 may be provided with a recess 30, or other alignment feature, such that the clearance gap 16 defined by the seal member 10 can be aligned with the relieved section 28 during assembly of the seal. The circular portion of the inner periphery 20a of the support member 18 has a diameter slightly larger than the diameter of the component 13 to be received within the bore of the seal arrangement such that the component 13 forms a clearance fit with the support member 18, the inner periphery of the support member 18 and the outer periphery 24 of the component 13 therefore together defining a clearance 26 therebetween.

In use, the component is inserted through the bore of the seal, the insertion of the component through the seal arrangement causing the inner periphery 12a of the seal member 10 to slightly increase in diameter so as to open the clearance gap 16. Once in position within the bore, the resilience of the seal member 10 causes the inner periphery 20a thereof to engage the outer periphery 24 of the component 13 in a substantially fluid tight manner. The region 28 of the inner periphery 20a of the support member 18 also engages the outer surface of the adjacent portion of the component 13. Thus, as the clearance gap 16 is substantially aligned with the section 28 of the inner periphery 20a, any leakage of fluid which may otherwise occur through the clearance gap 16 is masked by the section 28 such that a substantially fluid tight seal is formed between the seal arrangement and the component 13.

In order to assemble the seal, the support member 18 and the seal member 10 may be aligned in a fixture, by means of the alignment feature 30, prior to welding of the support member 18 to the seal member 10. Preferably, the inner periphery 12a of the seal member 10 and the inner periphery 20a of the support member 18 are ground simultaneously after welding, but prior to the fracture being formed in the seal member 10. The seal member 10 may then be fractured to form the clearance gap 16 by, for example, forcing a tapered mandrel through the bore of the seal arrangement, bending or shearing the seal member 10 in the weakness region 14, applying pressure to the inner periphery 12a of the seal member 10 or providing a lead-in chamfer on the component 13 to be received to the bore of the seal arrangement.

Figure 3A:
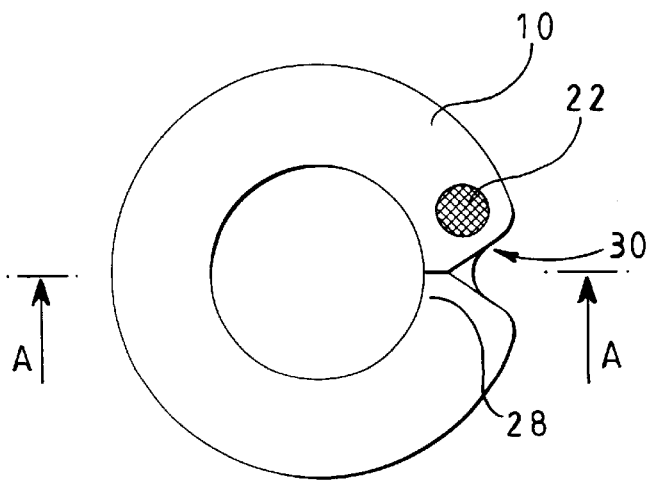
FIG. 3(a) is a plan view, from the underside, of an assembled seal arrangement
Figure 3B:
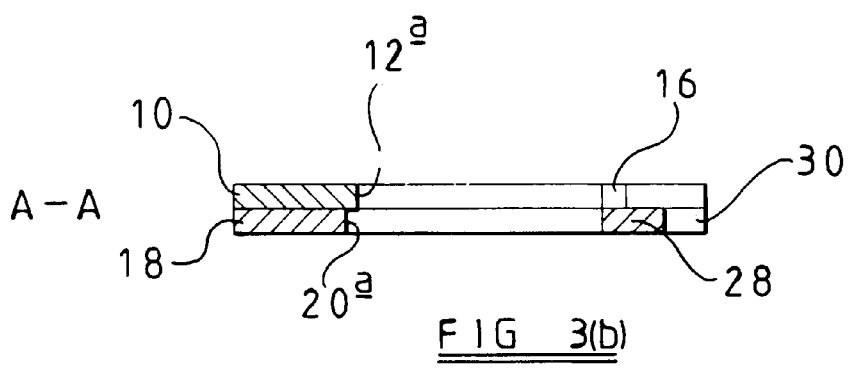
FIG. 3(b) is a sectional view, along line A—A, of the seal arrangement in FIG. 3(a)
Figure 4A:
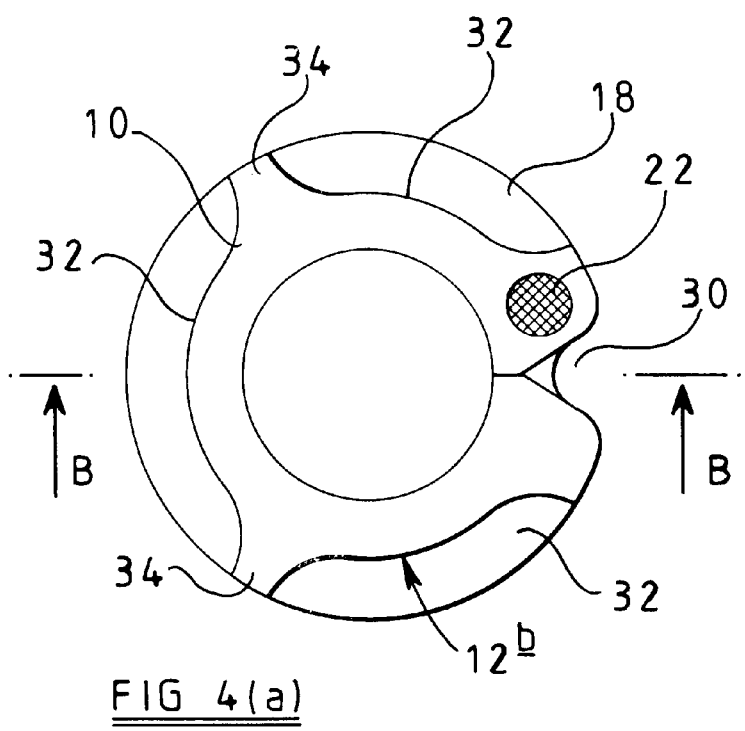
FIG. 4(a) is a plan view of an alternative embodiment of the seal arrangement of the present invention and FIG. 4(b) is a sectional view, along line B—B, of the seal arrangement in FIG. 4(a)
Figure 4B:
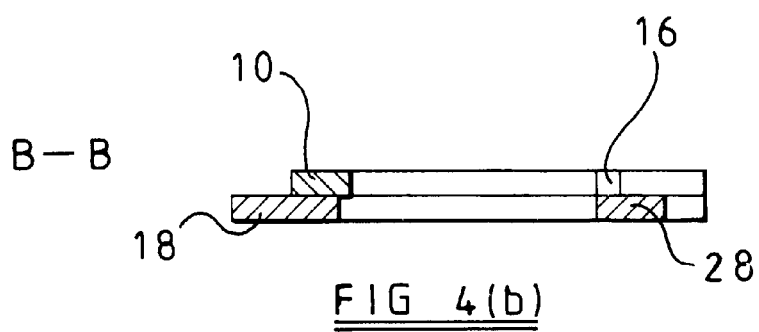

FIGS. 4(a) and 4(b) illustrate an alternative embodiment of the seal arrangement in which similar parts to those shown in FIGS. 1 to 3 are denoted with the same reference numerals. In this embodiment, the outer periphery 12b of the seal member 10 is provided with one or more regions 32 of reduced diameter and one or more regions 34 of larger diameter. By providing regions of reduced diameter, the flexibility of the seal member 10 is increased, thereby resulting in a reduced frictional load being applied to the outer periphery 24 of the component 13 received through the bore of the seal arrangement. The regions 34 of relatively large diameter provide a means for holding the seal member 10 during grinding of the bore of the seal arrangement and may also provide suitable weld points, such as region 22.

The seal arrangement is particularly suitable for use on a component in the form of a piston member which is slidable within a bore, the seal arrangement providing a substantially fluid tight seal with the piston member so as to seal the bore within which the piston is slidable. When the seal arrangement is arranged on the component, the resilience of the seal arrangement can compensate for slight inaccuracies in the positioning of the arrangement such that, if the component carrying the seal arrangement is machined in such a manner that the seal arrangement is tilted slightly relative to the axis of the component when in position, a substantially fluid tight seal can still be achieved.

Figure 5:
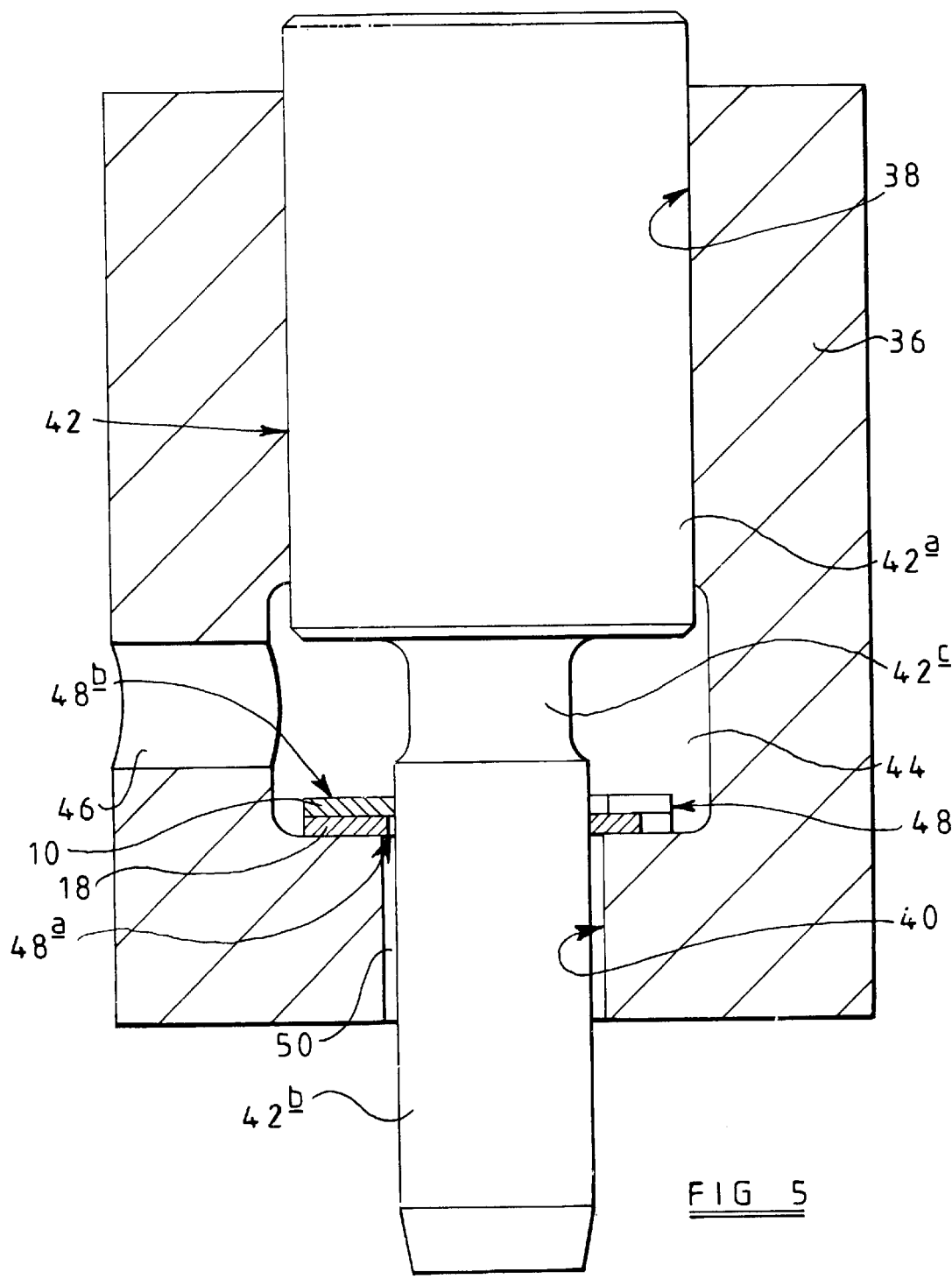
FIG. 5 is a view illustrating a part of a fuel injector which incorporates the seal arrangement in FIGS. 3(a) and 3(b).

FIG. 5 illustrates a part of a fuel injector incorporating a seal arrangement 48 of the type described hereinbefore with reference to FIGS. 3(a) and 3(b). The fuel injector includes a housing 36 provided with first and second bores 38, 40 respectively within which a piston member 42 is slidable, the housing 36 further defining a chamber 44 which receives fuel through an inlet passage 46. Typically, movement of the piston member 42 may control movement of the valve needle of the fuel injector to control fuel delivery through fuel injector outlet openings.

The piston member 42 includes an enlarged diameter region 42a which is slidable within the first bore 38, a region of smaller diameter 42b which is slidable within the second bore 40 and an intermediate region 42c which interconnects the enlarged region 42a with the region 42b. The region 42b of the piston member 42 is received through the bore of the seal arrangement 48, the seal arrangement 48 being located within the chamber 44 such that it seats against an inner surface of the chamber 44 under the pressure of fuel within the chamber 44. The diameter of the bore 40 is arranged such that the outer surface of the region 42b of the piston member 42 and the bore 40 together define a clearance passage 50. The seal arrangement 48 forms a substantially fluid tight seal with the outer surface of the region 42b of the piston member 42 such that, in use, the passage of fuel between the chamber 44 and the clearance passage 50 is prevented.

It will be appreciated that by providing the seal arrangement 48 to prevent fuel leakage between the bore 40 and the chamber 44, the diameter of the bore 40 within which the region 42b of the piston member 42 is slidable can be slightly greater than may otherwise be the case. Thus, any eccentricities which exist between the first and second bores 38, 40 can be accounted for. As lateral movement of the seal arrangement 48 within the chamber 44 is permitted, this further accommodates any eccentricities between the diameters of the first and second bores 38, 40.

A further advantage of the seal arrangement of the present invention is that, in use, any gradual wear of the bore of the seal arrangement or of the surface of the region 42b of the piston member 42 will cause the two ends of the seal member 10 to move closer together, thereby tending to reduce the clearance gap 16. Increased use of the seal arrangement does not therefore hinder the sealing function. Furthermore, if the clearance gap 16 closes completely, the bore of the seal arrangement will have substantially the same diameter as the region 42b of the piston member 42 such that most of the load on the bore of the seal arrangement and the surface of the region 42b is removed. In such circumstances, further wear of the bore of the seal arrangement, or of the region 42b of the piston member 42, is minimal and the seal arrangement will be in substantially frictionless contact with the outer surface of the region 42b.

As the inner periphery of the seal arrangement provides the sealing function, it may be desirable to provide a wear resistant coating to reduce wear of the seal arrangement or of the piston member 42. This can be applied to the outer surface of the region 42b of the piston member 42 and/or to the inner periphery of the seal member 10. In particular, this may be advantageous if, in use, high sliding velocities are likely to be encountered and/or extremely high pressures are to be encountered by the seal. Such coatings also reduce the risk of the seal member becoming welded to the component. When conventional seals are used, in which the external periphery of the seal provides a sealing function with a bore within which a piston member is sildable, it is necessary to provide a wear resistant coating to the inner surface of the piston bore and this can be difficult to achieve. Typically, the wear resistant coating applied to the surface of the region 42b of the piston member 42 may be titanium nitride, carbon tungsten carbide or diamond-like carbon.

The seal arrangement 48 in FIG. 5 may also be used to provide a one-way valve function. For example, fuel may be passed through the clearance 50 defined between the region 42b of the piston member 42 and the bore 40 such that, when the force applied to the underside 48a of the seal arrangement 48 exposed to fuel pressure within the clearance 50 exceeds the force applied to the upper side 48b of the seal arrangement due to fuel pressure within the chamber 44, the seal arrangement 48 is caused to lift away from its seating defined by the lower surface of the chamber 44. When fuel pressure within the chamber 44 increases such that the force applied to the surface 48b of the seal arrangement is greater than the force applied to the underside 48a, the seal arrangement 48 is urged against its seating to prevent communication between the chamber 44 and the clearance 50.

It will be appreciated that the piston member 42 in FIG. 5 need not form part of a fuel injector, but may form part of a fuel pump for high pressure fuel or may be used in any application in which the leakage of high pressure fluid is undesirable.

In some applications, it will be appreciated that the level of fluid leakage through the clearance gap 16 defined by the two ends of the seal member 10 may be sufficiently low that the need for the support member 18 is removed.

I claim:

1. A seal arrangement having a bore within which a component is to be received, in use, the seal arrangement comprising a seal member formed from a resilient material, the seal member having an inner periphery and an outer periphery and being provided with a fracture to define two ends of the seal member, the inner periphery of the seal member having, when in a relaxed condition, a smaller diameter than the diameter of the component such that, when the component is received through the bore of the seal arrangement, the two ends of the seal member are caused to part, the resilience of the seal member causing the inner periphery of the seal member to form a substantially fluid tight seal with the component, the seal arrangement further comprising a support member upon which the seal member is mounted, the support member being of generally annular form and having inner and outer peripheries, wherein the inner periphery of the support member is of generally circular form except for a region of irregularity.

2. The seal arrangement as claimed in claim 1, wherein the diameter of the inner periphery of the support member is selected such that it forms a clearance fit with the component to be received through the bore of the seal arrangement, in use, except for the region of irregularity.

3. The seal arrangement as claimed in claim 2, wherein the region of irregularity is provided by forming a relieved section on the inner periphery of the support member, the relieved section having a smaller radius of curvature than that of the generally circular section of the inner periphery of the support member so as to engage with a portion of the component, in use.

4. The seal arrangement as claimed in claim 3, wherein the outer periphery of the support member is provided with an alignment feature which permits the region of irregularity to be aligned with the clearance gap upon assembly of the seal arrangement.

5. The seal arrangement as claimed in claim 1, wherein the outer periphery of the support member is of generally circular form.

6. The seal arrangement as claimed in claim 1, wherein the outer periphery of the seal member is of generally circular form.

7. The seal arrangement as claimed in claim 1, wherein the outer periphery of the seal member is shaped to include enlarged regions of relatively large diameter and reduced regions of relatively small diameter.

8. A fuel pump comprising a piston member slidable within a bore, a surface associated with the piston member being exposed to fuel pressure within a chamber, the piston member carrying a seal arrangement as claimed in claim 1, the inner periphery of the seal member of the seal arrangement engaging the outer surface of the piston member to substantially prevent fuel from flowing between the bore and the chamber when the piston member moves within the bore.

9. A fuel injector comprising a piston member slidable within a bore, a surface associated with the piston member being exposed to fuel pressure within a chamber, the piston member carrying a seal arrangement as claimed in claim 1, the inner periphery of the seal member of the seal arrangement engaging the outer surface of the piston member to substantially prevent fuel from flowing between the bore and the chamber when the piston member moves within the bore.

10. The fuel injector as claimed in claim 9, wherein the piston member comprises a first region of relatively large diameter and a second region of relatively small diameter, the first region being sideable within a first bore and the second region being sideable within a second bore, the first bore and the second bore being substantially co-axially aligned, the second bore being of larger diameter than the diameter of the second region so as to define a clearance between the second bore and the second region, the seal member being arranged to sealingly engage the outer surface of the second region of the piston member so as to substantially prevent fuel flow therepast.

11. A pressure regulating valve for controlling fuel pressure within a passage, the valve comprising the seal arrangement as claimed in claim 1, the seal arrangement being in sealing engagement with the component received through the bore of the seal arrangement and the passage being defined, in part, by the component.

12. A method of manufacturing a seal arrangement as claimed in claim 1, comprising the steps of:

providing a seal member formed from a resilient material with a region susceptible to fracture, applying a force to the seal member so as to controllably fracture the seal member at the region of weakness.

13. The method as claimed in claim 12, wherein the region susceptible to fracture may be one of a stress concentration or an aperture.

14. The method as claimed in claim 12, wherein the method includes the step of inserting a member through the bore of the seal arrangement in order to fracture the seal member.

15. The method as claimed in claim 14, wherein the member inserted through the bore to fracture the seal member is the component to be received through the bore of the seal arrangement, in use, the component being provided with a chamfer.

16. The method as claimed in claim 12, whereby a shear force is applied to the seal member in the region susceptible to fracture in order to fracture the seal member.

17. The method as claimed in claim 12, comprising the further steps of;

providing a support member upon which the seal member is to be mounted, securing the seal member to the support member, forming a bore through the support member and the seal member, the bore being shaped such that an inner periphery of the support member is formed with a generally circular form except for an irregularity which is substantially aligned with the region of the seal member which is susceptible to fracture.

18. The method as claimed in claim 17, whereby the step of applying a force to the seal member to fracture the seal member is carried out after the support member has been secured to the seal member.

* * * * *